United States Patent [19]

Stephens et al.

[11] Patent Number: 5,253,692
[45] Date of Patent: Oct. 19, 1993

[54] BEAD PORTION OF A TIRE

[75] Inventors: Paul Stephens, Halesowen; Thomas Holmes, Coldfield, both of England

[73] Assignee: Sumitomo Rubber Industries, Limited, Hyogo, Japan

[21] Appl. No.: 685,282

[22] Filed: Apr. 15, 1991

Related U.S. Application Data

[62] Division of Ser. No. 630,192, Dec. 19, 1990, abandoned.

[30] Foreign Application Priority Data

Dec. 21, 1989 [GB] United Kingdom ............... 8928942
Sep. 21, 1990 [GB] United Kingdom ............... 9020590

[51] Int. Cl.⁵ .................. B60C 15/024; B60C 15/06
[52] U.S. Cl. .................................. 152/543; 152/544; 152/547
[58] Field of Search ............ 152/516, 517, 539, 543, 152/544, 542, 541, 547

[56] References Cited

U.S. PATENT DOCUMENTS

| | | |
|---|---|---|
| 3,915,215 | 10/1975 | Nebout ............... 152/444 |
| 4,019,551 | 4/1977 | Kolowski et al. ........ 152/541 |
| 4,029,138 | 6/1977 | Kresta ............... 152/543 |
| 4,148,348 | 4/1979 | French et al. . |
| 4,235,273 | 11/1980 | Edwards et al. ....... 152/517 |
| 4,269,251 | 5/1981 | Harrington et al. . |
| 4,351,382 | 9/1982 | Corner et al. ........ 152/516 |

FOREIGN PATENT DOCUMENTS

| | | | |
|---|---|---|---|
| 0167273 | 1/1986 | European Pat. Off. ......... 152/544 |
| 0860151 | 12/1952 | Fed. Rep. of Germany ...... 152/543 |
| 0297310 | 11/1989 | Japan ............... 152/544 |
| 8706889 | 12/1987 | PCT Int'l Appl. ........ 152/544 |
| 1480917 | 7/1977 | United Kingdom ............ 152/544 |

*Primary Examiner*—Michael W. Ball
*Assistant Examiner*—Nancy T. Krawczyk

[57] ABSTRACT

The invention is directed to a tire for mounting on the wheel rim of a vehicle. The tire comprises a pair of bead portions each reinforced by a bead hoop, at least one bead portion of the tire having an additional retention zone positioned axially inwards of and integral with the main bead portion, the retention zone having an axially inner tip or toe substantially inwards of the main bead portion and the construction of the bead portion and the additional retention zone between the bead hoop and tip providing substantial resistance to compressive forces therebetween. The portion between the bead hoop and the tip can include reinforcement and can comprise an elastomeric material having a hardness of 80 to 95 degrees I. R. H. The tip is formed from an elastomeric material having a set property at 70° C. of greater than 40% so that when the tip is fitted to a wheel rim having sharp teeth in the region contacted by the tip, the material of the tip engages the teeth. The tip may be provided by means of a strip of material positioned at the axially and radially innermost point of the tire toe. The tire can also comprise a chafer layer extending around the outer periphery of the bead in which case the strip of material providing the tip is positioned on the outside of the chafer.

8 Claims, 4 Drawing Sheets

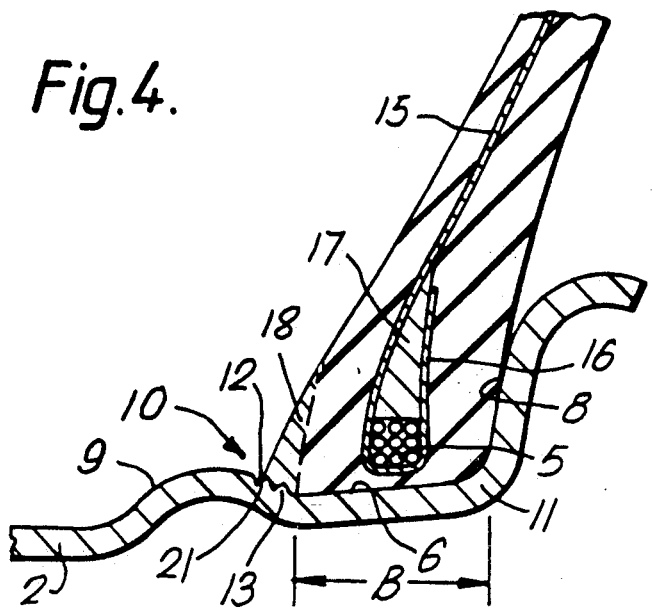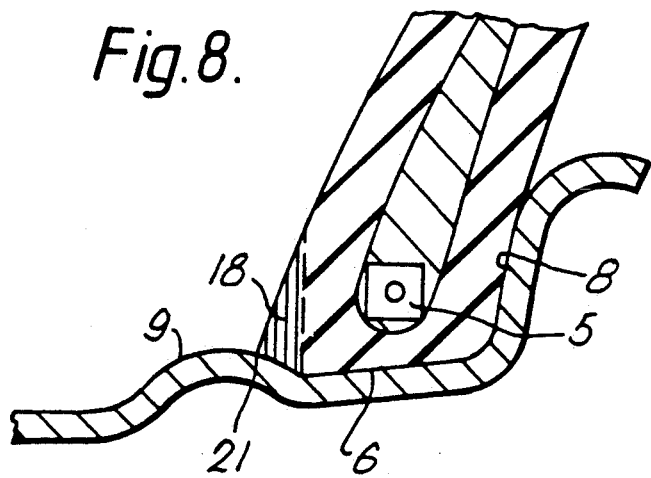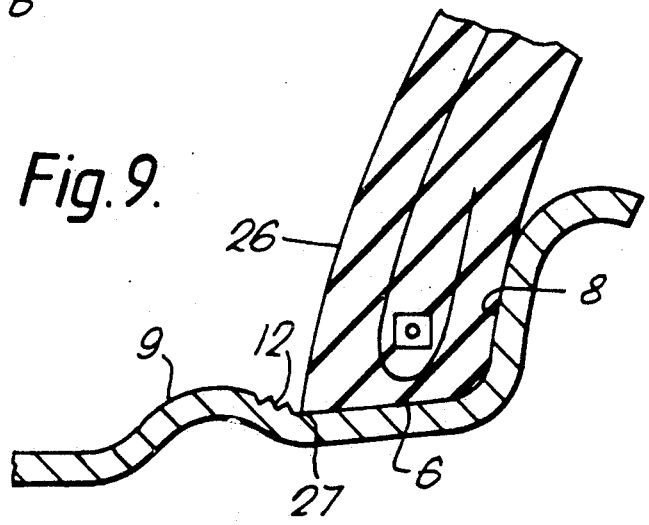

BEAD PORTION OF A TIRE

This application is a divisional of U.S. application Ser. No. 07/630,192, filed Dec. 19, 1990 now abandoned.

BACKGROUND OF THE INVENTION

This invention relates to a tire and wheel rim assembly and in particular to tubeless pneumatic tire and wheel rim assemblies.

In conventional pneumatic tire and wheel rim assemblies the tire beads are retained on their respective bead seats by means of the internal air pressure and commonly by the bead seats being tapered and/or the use of a safety hump.

Deflation of the tire, however, or operation in a partially deflated state leaves the assembly in a relatively unsafe condition in which the tire beads may be moved from their respective bead seats by sideways force. Such a condition may affect the control and safety of the vehicle and in the case of the commonest types of wheel rim having a well to allow the tire fitting, there is a grave danger of complete separation of the tire from its wheel rim and/or contact of the wheel rim flange with the road surface. Both these conditions are dangerous.

Many suggestions have been made to deal with this problem including bead spacer rings and the tire and wheel rim assembly known as the TD tire which is disclosed in U K Patent Specification No. 1584553.

The latter TD type of construction uses a circumferentially extending groove in the wheel rim adjacent to the bead seat and a radially and axially projecting toe on the tire engaging in the groove. This construction, however, requires a larger well in the wheel rim than in a conventional assembly which reduces the usable volume within the wheel for brake space and also has a severe problem in compatibility in that the fitting of a tire without the necessary projecting toe to the TD type of wheel rim gives an assembly which has a reduced bead retention property to a standard tire on a standard wheel rim. This reduction in bead retention properties of a standard tire on the wheel rim so far has made it essential for the diameter of the TD type of tire and wheel rim to be made different from the normally accepted inch diameter tire and wheels to ensure this mis-match cannot occur in practice. This has limited the adoption of the TD bead retention system.

Another prior art approach to the problem is disclosed in U K Patent Specification 2026957 which uses a tire bead having a sector of the main bead region, which is the axially and radially inner portion of an otherwise normal bead, constructed so that progressive rotation of the bead generates a substantially increasing compression in the bead and thus a continually increasing tension in the bead hoop. This can be done either by an increase in hardness around the sector or a progressive increase in dimension. The specification requires an additional friction increasing means between the tire contacting portion of the bead seat and the region of the bead seat which contacts the wheel rim in the normally seated condition to ensure the necessary rotation without relative slippage. Friction increasing means disclosed include knurling or other mechanically formed grooving or teeth on the bead seat of the wheel rim and thus the disclosure teaches an assembly having a bead seat on the rim which is not suitable for a standard tire bead because of the specially machined bead seat. The tire bead shape is not conducive to correct and secure seating or sealing of the assembly. Also reliance is made on frictional grip once the bead has rotated beyond its initial rest position and the wheel rim cannot be used for a normal tire.

In each case of the prior art, whilst some retention may be provided, true compatibility with tires not of the required construction has not so far been achieved and in each case either the special tire cannot be used on a standard type rim, a standard tire cannot be used on the special rim or both.

SUMMARY OF THE INVENTION

Thus, it is an object of the present invention to provide a tire and a wheel rim which when used together give fully effective bead retention and yet allow for alternative fitments of standard tires or to standard rims without mis-match problems.

Accordingly, one aspect of the present invention provides a tire and wheel rim assembly for a vehicle, the tire comprising a pair of bead regions each reinforced by a bead hoop and the wheel rim comprising a pair of bead seats characterised by one bead region of the tire having an additional retention zone positioned axially inwards of and integral with the main bead region, the retention zone having an axially inner tip or toe substantially inwards of the main bead region and the construction of the bead between the bead hoop and tip providing substantial resistance to compressive forces therebetween and the wheel rim comprises axially inwards of and adjacent to one of the bead seats, which is that part of the bead seat contacted by a standard, a circumferentially extending tooth having a sharp edge inter-engaging only the retention zone of the tyre at the tip such that when lateral force is applied to the tire tread and internal inflation pressure is low, axially inward movement of the tip is resisted by tip-to-tooth inter-engagement thus causing bead rotation about the tip and generation of compression force in those parts of the bead region between the tip and the hoop to provide bead retention at the bead seat.

Preferably the width of the additional retention zone is 5 to 30% of the width of the bead (J dimension). More preferably the width of the additional zone is 15 to 25% of the J dimension. (In each case the J dimension is the total width of the bead of the invention). Also the bead width of the tire from the heel point to the tip (which is the J. dimension) may be greater than the axial width of the bead seat of the wheel rim so that the tip is on a portion of the rim beyond the seat.

The bead and special tooth on the wheel rim are preferably provided at both sides of the wheel rim so that both beads are retained. The bead seats may be on the radially outer surface of the wheel rim or on the radially inner surface to suit either the conventional tubeless pneumatic tire or the alternative system known as the CTS.

The wheel rim assembly and the wheel rim may have the bead seat of any of the conventional tapered shapes including the shapes with more than one angle of taper such as the contrepente wheel rim.

Another aspect provides a wheel rim for the tire and wheel rim assembly comprising a pair of bead seats axially spaced apart and, adjacent to one of the bead seats and axially inwards thereof, a circumferentially extending tooth having a small radius edge or top.

Preferably the small radius is less than 2 mm to give sufficiently sharp tooth. More preferably the radius is between 0.2 and 0.7 mm and in particular between 0.2 and 0.3 mm or even 0.2 to 0.27 mm. In some cases a radius of 1.0 to 2.0 mm can be used. The final choice depends on the toe material.

Three teeth may be provided although that number is not critical. The important feature is to provide at least one tooth under the tip regardless of tolerances on tire and wheel rim dimensions.

The depth of the teeth may be in the range of 0.65 to 0.85 mm and the distance from the top of one tooth to the top of the next adjacent tooth is in the range of 1.2 to 1.8 mm, or 1.3 to 1.8 mm being 1.5 mm in one embodiment.

The wheel rim immediately inboard of the bead seat may be a conventional flat ledge or more preferably it comprises a bead retaining hump of either the round hump or flat hump type. In the case of humps the tooth or teeth may be provided on the side of the hump nearer to the bead seat which ensure it is well clear of a conventional tire fitted to the rim.

The type of flange for the wheel rim is optional and any conventional flange may be used in conjunction with the special bead of the present invention.

The resultant wheel rim provides the necessary tooth or teeth for the special tire of the present invention but also much more importantly provides for a standard tire bead of standard width with a bead seat which is entirely normal and which includes no special shapes or finishes. Accordingly, a standard tire can be fitted to and run on the rim of this invention without any problems and with the normal degree of bead retention for the rim type be it flat ledge, hump, flat hump or the like.

Preferably three distinct teeth are provided to give the tire bead engaging region and the region is positioned on a bead retaining hump provided axially inwards of and adjacent to the inner edge of the bead seat. The retaining hump may be the conventional hump as in the ETRTO Wheel Rim Standards and in that case the teeth are provided in the axially outer slope of the hump such that the top of the axially most outward tooth is coincident with the standard rim profile. The remaining teeth are equi-spaced along a straight line sloping at 15° to the horizontal so that their tops are slightly below the level of the said standard rim profile and the axially most inward groove is blended into the standard rim profile. As a result, when a standard tyre is fitted to the wheel rim, it is easily assembled in the same way as a normal assembly because it is effectively a standard rim. Once fully seated, however, a standard tire does not reach to the teeth but sits on the normal bead seat.

Another aspect of the invention provides a tire having in at least one bead a circumferentially extending inextensible bead hoop and an additional retention zone positioned axially inwards of and integral with the main bead region, the retention zone having an axially inner tip or toe substantially inwards of the main bead region, the construction of the bead between the bead hoop and the tip being such as to provide substantial form stiffness to indicated compression forces between the hoop and tip and the tip of the tire being formed by a material having a compression set property at 70° Centigrade of greater than 40%. Set property is the property of an elastomeric material which determines to what degree the material remains permanently deformed as a result of the application of a compressive fore after the removal of that compressive force. Testing for the set property was carried out to ASTM D395-69B.

The tip may be formed by a material having a hardness of 80 to 95 degrees IRH. The material may also have a tear strength at room temperature of 30N/Test piece more. (Tested according to ASTM624 using Die C.)

Preferably the width of the additional retention zone is 5 to 30% and more preferable 15 to 25% of the width of the tire bead (J dimension). Also the bead width of the tire from the heel point to the tip (J dimension) is greater than the axial width of the standard bead seat dimension for the tire of the size concerned so that the tip, when fitted to a wheel rim contacts the rim inboard of the standard seat.

The tip material may be the material of the main part of the main bead region and the additional retention zone as long as the required properties are provided at the tip. More preferably, however, the tip material is provided in a narrow tip zone extending axially outwards from the tip along the radially inner face of the additional retention zone for between 3 and 5 mm. The tip zone may be 1 to 3 mm in thickness, i.e. measured radially of the tire.

The tire bead may include a chafer ply extending around the bead surface at least from the heel point to a point on the axially inner face of the bead at the radial height of the bead core center. Preferably, the tip zone material is located outside said chafer so that the tip material may directly engage the teeth on a wheel rim.

The resultant tire has a bead which, whilst being wider than a conventional bead to provide the necessary inter-engagement with its special region, has a standard shape of bead seat without radially projecting toes and so the tire can be fitted to a standard wheel rim without difficulty.

Thus, the invention provides a tire which can be used on a standard rim when necessary with standard bead retention properties but which when fitted to a special rim has greatly enhanced bead retention properties giving a greater degree of safety. Furthermore, the special rim is also able to carry a standard tire with standard bead retention properties. The invention therefore provides a tire and wheel rim which allow for full compatibility with standard tires and wheel rims known in the art.

The assembly may be used on any vehicle including cars, trucks, motor-cycles, aircraft etc.

The tire may be a cross ply, radial or any other known tire having reinforced beads.

BRIEF DESCRIPTION OF THE DRAWINGS

Some embodiments of the present invention will now be described, by way of example only, to show further aspects of the invention in conjuction with the attached diagrammatic drawings which are as follows:

FIG. 4 is an enlarged cross sectional view of the tire of the present invention on its rim;

FIG. 8 shows the tire of the present invention on a conventional round humped rim;

FIG. 9 shows a conventional tire on the wheel rim of the present invention;

DETAILED DESCRIPTION OF THE PREFERRED EMBODIMENTS

Figure 1:
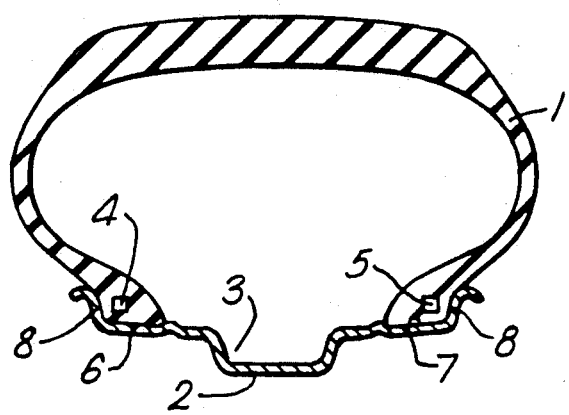
FIG. 1 is a part cross section of the tire and wheel rim assembly according to the present invention.

The tire shown in FIG. 1 comprises a tubeless tire carcass 1 fitted to a wheel rim 2 having a central fitting well 3. The tire is reinforced by a pair of bead hoops 4 and 5 and is also reinforced by conventional carcass and breaker assembly neither of which are shown as the main structure of the tire is not a feature of the present invention. Again, as is conventional, the wheel rim has two tapered bead seats 6 and 7 which are tapered at 5 degrees and each bead seat has associated therewith an upright flange 8. The tire and the wheel rim have co-operating engagement features 9 and 10 which will be described later in relation to an enlarged view.

Figure 2:
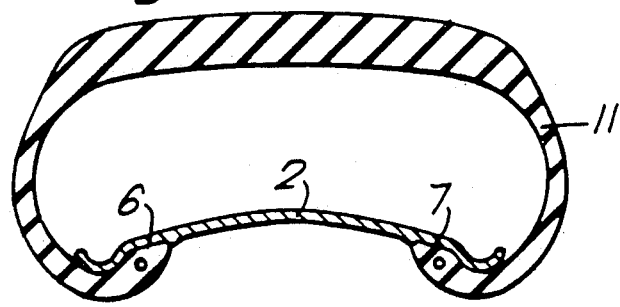
FIG. 2 is a part cross section of a tire and wheel rim assembly of the CTS type with bead retention according to the present invention.

The embodiment shown in FIG. 2 is a CTS type tire and wheel rim assembly. This again has a tire carcass reinforced by a carcass ply and breakers (not shown) and has two bead seats 6 and 7 which this time are on the radially inner surfaces of the wheel rim 2. The bead seats 6 and 7 are tapered as is normal for this tire and wheel rim assembly but are provided with additional features similar to those in FIG. 1 and which again will be described beneath.

FIG. 4 shows an enlarged view of one bead and its co-operating bead seat for the tire of FIG. 1. The version for the CTS type tire of FIG. 2 is exactly the same in features although drawn on the inner face of the wheel rim and this design will not be described in detail.

Figure 5:
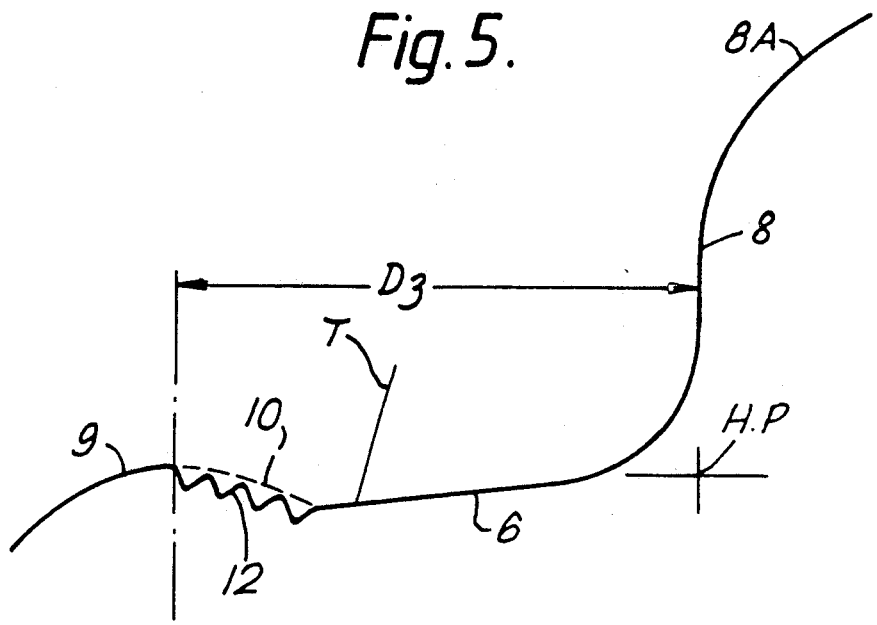
FIG. 5 is a cross-sectional drawing showing the tire contacting profile, i.e. the radially outer profile, of a bead seat and flange at one side of a wheel rim of the hump tire shown in FIGS. 1 and 4.

The wheel rim, as shown in FIG. 5, is based on a standard wheel rim according to ETRTO dimensions of the round hump type but is modified in one region which will be described in detail below. This particular wheel rim is for a car tire and therefore comprises a tapered bead seat 6 which is tapered at 5° to the axial direction of the wheel and an upwardly projecting rim flange 8 with a flared out region 8A. The wheel rim is of the nominal diameter for the tire concerned and has a conventional heel point HP as defined in the ETRTO Standards.

The bead seat 6 has a round hump 9 axially inboard of the seat and this hump 9 is positioned from the heel point HP exactly the same as in a standard rim. In order to show the shape of the standard rim, the region 10 marked with a broken line is shown in FIG. 5 and in FIG. 6.

This particular rim is meant for a 14" tire and so it has a hump radius of 8 mm and the dimension from the center of curvature of the hump to the heel point HP is 19.8 mm.

In the region of the hump 10 shown by the broken line, however, four grooves are machined, or otherwise formed, so that three sharp edged teeth 12 are left. These teeth 12 extend circumferentially of the wheel. Each tooth has a top radius R1 of 0.25 mm, a base radius R2 of 0.3 mm and a depth D1 of 0.75 mm. The distance D2 between the tops adjacent teeth is 1.5 mm. Thus, three sharp teeth 12 are provided on the wheel rim. The distance to the beginning of the first groove is the same as the distance from the center rib of curvature of the hump 9 from the heel point and, therefore, D3 in this case is 19.8 mm.

Figure 6:
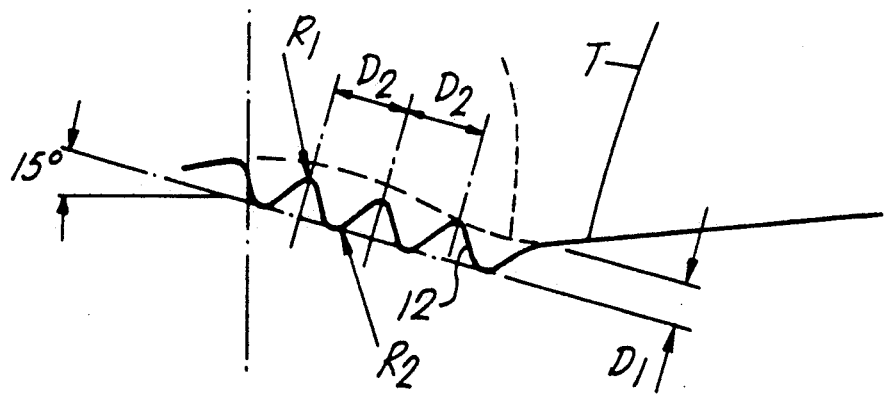
FIG. 6 is an enlarged view of part of FIG. 5.
Figure 7:
FIG. 7 is an enlarged view of the same region of an alternative rim based on a flat hump wheel rim.

The wheel rim shown in FIG. 7 is based on a wheel rim of the flat hump type which means that the original wheel profile is shown by numeral 11; but this too is modified in that the profile used comprises a series of three teeth 12, each of the same dimension as those in FIGS. 5 and 6.

In this case, however, the wheel rim is meant for a 15" diameter, tire and so that other dimensions of the wheel rim including the bead seat width are larger than for the smaller tire described above. Here the distance from the top of the axially most outward tooth 12 to the heel point is 18.0 mm. Again, the top of this tooth is coincident with the flat hump profile whilst the other teeth 12 are below this profile.

Figure 3:
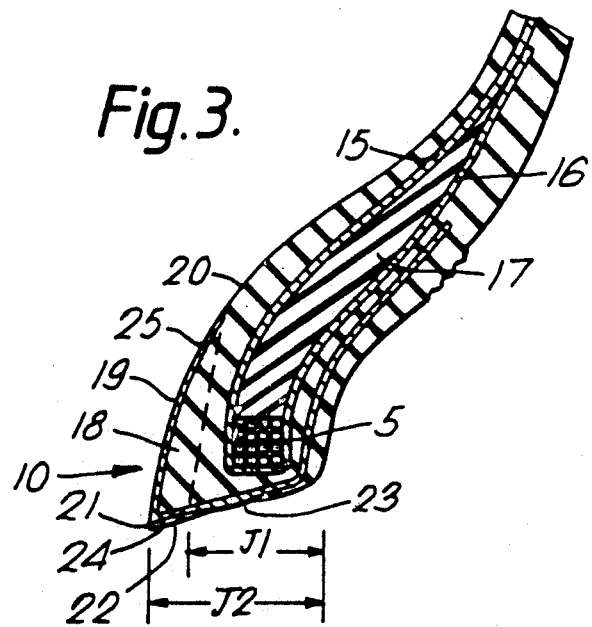
FIG. 3 is an enlarged cross sectional view of one bead of the tire of the present invention.

The tire of the present invention comprises a bead hoop 5 of the 6×4 creel type. Any normal bead may be used including one formed from a single wire wound several times around a former so that only two ends occur. A carcass ply 15 is wrapped in an axially outward direction around the bead hoop 5 to form an edge turn-up 16 and a bead apex of triangular cross section 17 is positioned upon the bead hoop 5 as shown. So far, the bead is of entirely conventional construction. However, the bead is made substantially wider than conventional beads for a tire of the same size and wider than the bead seat width B required to fit International Standard rims. This is achieved by providing a retention zone 18 which is of triangular cross section and which provides an axially inward extension of the bead to make it sufficiently wide so that the axially inner edge of the bead engages the teeth 12. The retention zone 18 is basically triangular in section having an axially inner surface 19 which merges to the line of the inner surface 20 of the main bead region as shown in FIG. 3. The retention zone 18 is integral with the main bead region.

The width J2 of the resultant bead is substantially greater than the width J1 of the standard bead. For example, a 15" tire has a width J2 of 20 mm compared with a standard bead width J1 of 17 mm.

The retention zone 18 has a profile similar to a standard tire providing a pointed tip 21 and a bead seat zone 22 which is a straight continuation of the main bead seat 23. In the region of the tip 21 a 1 mm thick engagement strip 24 is provided. The strip has a width of 5 mm in the axial direction from the tip 21. This strip may extend a short distance up the axially inner surface 19 of the bead, but that is not necessary.

The engagement strip 24 comprises rubber compound having a compression set property at 70 degrees Centigrade of greater than 40%. This provides an engagement zone 24 which effectively creeps around the teeth 12 as will be described below. A chafer strip 25 of cross woven nylon material is positioned in the outer part of the bead extending around the toe from beneath the bead hoop 5 to provide a skin on the toe of the overall bead. The cords of this strip are preferably laid at 45 degrees. The engagement strip 24 is located on the outer surface of the chafer stip 25.

The engagement strip 24 preferably has a hardness of 80 to 95 degrees IRH and a tear strength measured according to ASTM624 Die C at room temperature greater than 30 N/tp (Newtons per test piece) in order to provide the required properties for use in engaging with the teeth 12.

For the remainder of the bead both the retention zone 18 and the main bead between the bead core 5 and the tip 21 preferably comprise material having a hardness greater than 80 degrees IRH. More preferably the hardness of this zone approaches 95 degrees IRH. This material hardness may be assisted by means of a filler material or other such means to provide overall compression resistance.

Suitable compositions for the engagement strip 24 and the region of the bead between the tip 21 and the hoop 5 are as follows:

| Engagement Strip Material | |
| --- | --- |
| | pphp |
| Polyoctenylene | 40 |
| Natural rubber | 60 |
| Zinc oxide | 4 |
| Stearic acid | 1 |
| Carbon black N326 | 80 |
| Reinforcing resin | 5 |
| Tackifying resin | 6 |
| HMT[1] | 2 |
| NOBS[2] | 1 |
| Enerflex 94[3] | 5 |
| Sulphur | 4 |

[1] HMT is Hexamethylene Tetramine available from Montedison UK
[2] NOBS is N-Oxydiethylene Benzthiazole 2-Sulphenamido available from Monsanto or Sanotocure MOR
[3] Enerflex 94 is a trademark of BP Oil Limited for an aromatic process oil, with an equivalent being available from the Sun Oil Company.

| Material for Region between Lip and Hoop | |
| --- | --- |
| | pphp |
| Natural rubber | 100 |
| High styrene resin | 10 |
| N375 black | 74 |
| Zinc oxide | 4 |
| Stearic acid | 2 |
| NCY | 4 |
| Reinforcing resin 65% | 9 |
| Aromatic oil | 6 |
| Sulphur | 4 |
| Hexa[1] | 1.1 |
| NOBS | 0.5 |

The resultant materials have the following properties:

| Engagement Strip Material | |
| --- | --- |
| Hardness | 89.3 Wallace D.L. I.R.H.D. |
| Set at 70 degrees C. | 55.2% ASTM |
| Tear at Room Temp | 36 N/Test piece |

[1] Hexa is a trademark good of Bayer UK Limited, the good being composed of 80% HMT + 20% Ethylene Vinyl Acetate.

| Material for Region between Lip and Hoop | |
| --- | --- |
| Modulus | 6.7M pa @ 150% ext. |
| Resilience @ 50 degrees C. (Dunlop Tripsometer) | 39.5 |
| Hardness (Wallace DL) | 95 IRHD |

The tire and wheel rim of the present invention is shown assembled in FIG. 4 where it can clearly be seen that the dimensions of the tire cause the toe 21 to engage the teeth 12 with the material of the engagement strip 24 on the teeth 12. Thus, the tire is able to fully seat against its flange 8 and on its bead seat 6 whilst the toe 21 engages the teeth 12 by the material of the engagement strip 24 at least partially flowing around the teeth 12. It will be appreciated that fitting of the tire to wheel rim is entirely conventional with air pressure blowing it home over the hump 9 which because it is of standard hump diameter provides no real resistance to tire fitting.

If the tire of the present invention is fitted to a conventional wheel rim either of the flat ledge type of the round, or flat hump type as shown in FIG. 8, the tire seats on the wheel rim in a very similar way to on its own rim except that the engagement strip 24 and the tip 21 simply lie upon the axially outer portion of the hump 9. In this condition the tire has very similar bead retention properties to a standard tire on the same rim as will be shown in the results quoted later.

Another possible assembly is a standard tire bead 26 fitted to the wheel rim of the invention as shown in FIG. 9. Here the standard bead width means that the conventional toe 27 is on the main bead seat 6 and the toe does not reach the serrations or teeth 12. Thus as far as a standard tire is concerned for normal running it is seated on a rim which is entirely standard and when in the dislodgement mode a very similar performance to standard tire on a standard rim is obtained as again will be shown in the results following.

Figure 10:
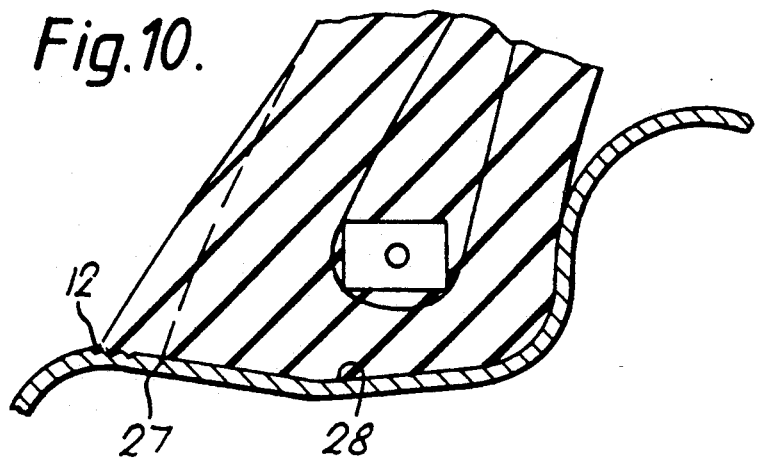
FIG. 10 shows an alternative embodiment of the present invention intended for a contrepente type wheel rim.

FIG. 10 shows an alternative construction using a contrepente rim provided with a set of teeth 12 positioned again axially inwards of a point where the toe 27 of a standard tire would be seated on the contrepente bead seat 28. Details of the fit of the tire of the invention to this rim are exactly the same as for the previous embodiment and so they will not be described here.

Figure 11:
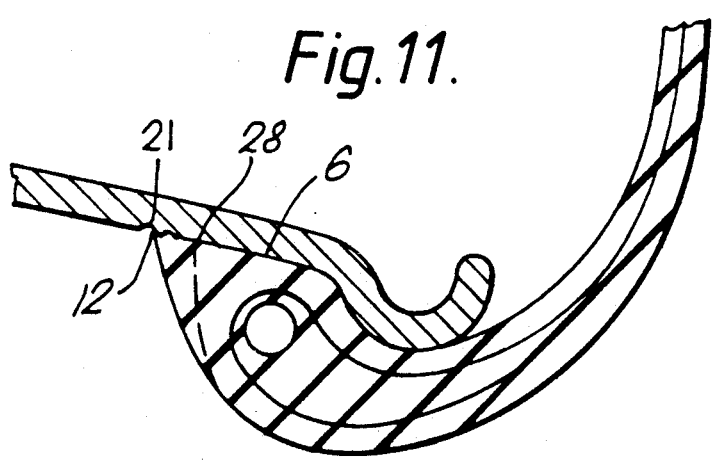
FIG. 11 shows an embodiment of the present invention for the CTS type of tire and wheel rim assembly.
Figure 12:
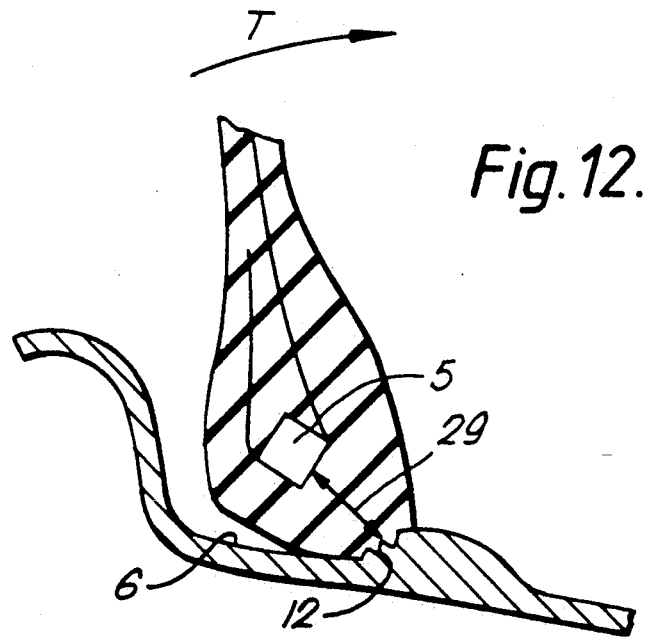
FIG. 12 is a view of the bead rim of the invention to illustrate the operation of the invention.

The tire and wheel rim shown in FIG. 2 of the CTS type has its one bead and bead seat shown enlarged in FIG. 11 and once again the bead seat 6 has its normal taper to the point where the toe 28 of the standard CTS tire reaches and then adjacent thereto but axially inwards of serrations 12 which again engage the tip 21 of the tire according to the present invention. In this case the bead seat and its extension axially inwards are shown flat, although a round hump or flat hump could be provided.

In use of the present invention the tire and wheel rim are seated as shown in FIG. 4 for all normal running. As mentioned previously fitting of the tire is entirely conventional using air pressure to blow the beads home over the hump or flat ledge region, past the teeth 12 and onto the bead seat 6 with the bead contacting the flange 8. Due to the construction of the special tire however, its tip 21 is then in engagement with the teeth 12. For normal inflated running of the tire the bead remains seated firmly on, its seat and against its flange 8.

If excessive side force is applied from the tire/ground interface or, when the tire is partially deflated which is much more common, when there is complete loss of air pressure within the tire then axially inward movement of the tire tread in a conventional tire and wheel rim assembly causes the bead to move axially inwards from its seat 6 allowing air to leak around the bead and the tire to lose any remaining air pressure and much more importantly allowing the bead to move axially inwards where it can reach the well of the rim. This can result in the tire dismounting itself or the flange of the wheel rim contacting the road, both these conditions being very dangerous. Furthermore, because the bead is not held at its seat 6 side force cannot be generated by the tire and vehicle handling is severely affected.

In the present invention, however, the tip of the tire engages around the teeth 12 and so inward movement of the tip is resisted and, thus, the axially inward tread movement which applies a moment T to the bead zone causes rotation of the bead zone with the tip/toe engagement to the teeth 12 acting as a fulcrum. This brings the region 29 of the bead between the hoop 5 and the tip/tooth engagement point under increasing compression which becomes greater and greater as the amount of rotation increases. This compression force produces a reaction force in the bead hoop 5 which causes the hoop to be tensioned and this retains the bead around the circumference of the tire firmly against the seat 6 so as to prevent bead dislodgement.

It should be noted that the moment T is generated by a force from the tread/road interface a distance away from the bead zone even in a deflated tire. In contrast, when a tire removal tool or bead breaker is placed against the flange of the wheel rim and pushed against the tire bead the moment T is not generated and the tire may be dismounted in the conventional way.

To illustrate the effectiveness of the invention, tires in size 225/65 VR 15 were manufactured having a bead width of 20 mm and using the compounds described above for the engagement strip 24 and the zone of the bead between the hoop and the tip 21. The tires were tested on a rim according to the present invention. The tire was also tested on a standard rim of the same dimensions but without the teeth 12 and then a standard tire without the retention zone was tested on the wheel rim of the invention.

The test was in two parts and comprised a J turn test and a circling test, both of which are known in the industry for testing bead retention.

The J turn test comprises driving a vehicle with the test unit on the outer front wheel and with the vehicle loaded to its standard maximum load at a pre-set speed and applying as quickly as possible full turning lock whilst declutching. The vehicle then follows a J turn and comes to a halt. The test is repeated with progressive reductions of tire pressure of 0.2 bar until dislodgement occurs and then if necessary at 0 pressure and higher speed increments.

The circling test comprises driving the vehicle at 60 kph in a tangential direction into a 50 meters diameter circle and then maintaining the speed around the circle for one full turn. The vehicle is run in the fully laden condition and once again the tire pressures are reduced stepwise in steps of 0.2 bar from standard pressure to 1.0 bar and then in steps of 0.1 bar until dislodgement occurs. The following Table shows the results obtained.

TABLE

| tire | Wheel | J Turn Test Pressure/ Speed | Circling Test Dislodgement Pressure |
|---|---|---|---|
| Invention | Invention | 0/40 mph | 0.1 bar |
| Invention | Standard flat hump | 0.7 bar | 0.8 bar |
| Standard tire | Invention | 0.9 bar | 0.7 bar |
| Standard tire | Standard hump | 0.9 bar | 1.0 bar |

As can clearly be seen the tire of the present invention has a substantially improved bead retention property over all other combinations. Furthermore, full compatibility of different tires on different rims was achieved from those which would have been expected for a tire or wheel rim not according to the present invention.

For the tooth dimensions tests have shown that radii as small as 0.2 mm are successful with tires having the materials for the tire toe tip as described. Radii smaller than 0.2 mm have been found to be sufficiently sharp to damage tires on dislodgement and sometimes on fitting and/or stripping, both of the special type and occasionally standard tires when they are fitted to the wheel rim.

With regard to the greatest radius, recent tests have shown for a car tire that 0.27 mm is a suitable maximum which provides a tooth still sufficiently sharp to give good retention properties, although the figures given in the original Application of up to 2 mm are still valid depending upon the properties selected for the tip material.

Similarly different tooth depths can be used although a minimum of 0.65 mm and a maximum of 0.85 mm have been found to be particularly effective for a car wheel rim together with the range of 1.3 to 1.8 mm for the distance from the top of one tooth to the top of the next adjacent tooth.

It must be noted that in each case the teeth are provided in the region of the wheel rim which is not contacted by a standard tire if it is fitted to the wheel rim. Such a standard tire is indicated by the line T in each of FIGS. 5, 6 and 7.

What is claimed is:

1. A tire comprising in at least one main bead region a circumferentially extending inextensible bead hoop and an additional retention zone positioned axially inward of and integral with the main bead region, the additional retention zone having an axially inner tip or toe substantially axially inward of the main bead region, the construction of the bead between the bead hoop and the tip being such as to provide substantial form stiffness to withstand compression forces between the hoop and tip and the tip of the tire being formed by an elastomeric material having a compression set property at 70° Centigrade of greater than 50% such that when the tire is fitted to a wheel rim having sharp teeth in the region contacted by the tip, the material of the tip engages the teeth.

2. The tire according to claim 1 wherein the elastomeric material between the bead hoop and the tip has a hardness of 80 to 95 degrees IRH.

3. The tire according to claim 1 wherein the bead between the hoop and the tip includes a reinforcement material to provide resistance to the compression force.

4. The tire according to claim 1 further comprising a chafer layer extending around the outer periphery of the bead from a point under the bead hoop, around the tip and to a second point at least as high as the hoop centerline on the interior of the tire to provide a skin reinforcement for the bead.

5. The tire according to claim 1 further comprising at the tip of the retention zone which tip contacts a wheel rim when the tire is mounted on said wheel rim a tooth engagement strip comprising elastomeric material having a compression set property at 70° Centigrade of greater than 50%.

6. The tire according to claim 1 wherein the elastomeric material of the tip has a tear strength at room temperature of 30 N/test piece or more.

7. The tire according to claim 1 wherein the tip is provided by means of a strip of material having the said property positioned at the axially and radially innermost point of the tire toe.

8. The tire according to claim 4 wherein the tip is provided by means of a strip of material having the said property positioned outside the chafer layer and at the axially and radially innermost point of the tire.

* * * * *